(12) United States Patent
Hagiwara

(10) Patent No.: US 10,971,976 B2
(45) Date of Patent: Apr. 6, 2021

(54) ELECTRIC DRIVE DEVICE AND ELECTRIC POWER STEERING DEVICE

(71) Applicant: HITACHI AUTOMOTIVE SYSTEMS, LTD., Hitachinaka (JP)

(72) Inventor: Katsumasa Hagiwara, Isesaki (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 102 days.

(21) Appl. No.: 15/757,134

(22) PCT Filed: Aug. 12, 2016

(86) PCT No.: PCT/JP2016/073697
§ 371 (c)(1),
(2) Date: Mar. 2, 2018

(87) PCT Pub. No.: WO2017/154236
PCT Pub. Date: Sep. 14, 2017

(65) Prior Publication Data
US 2018/0248451 A1 Aug. 30, 2018

(30) Foreign Application Priority Data
Mar. 9, 2016 (JP) .............................. JP2016-045415

(51) Int. Cl.
*H02K 11/215* (2016.01)
*H02K 11/33* (2016.01)
(Continued)

(52) U.S. Cl.
CPC ......... *H02K 11/215* (2016.01); *B62D 5/0406* (2013.01); *B62D 5/0481* (2013.01);
(Continued)

(58) Field of Classification Search
CPC .... H02K 11/215; H02K 11/33; H02K 11/022; H02K 5/221; H02K 5/225;
(Continued)

(56) References Cited

U.S. PATENT DOCUMENTS 6,081,056 A * 6/2000 Takagi .................... H02K 5/08
310/216.137
2011/0012457 A1 1/2011 Ikitake et al.
(Continued)

FOREIGN PATENT DOCUMENTS

JP 2011-176999 A 9/2011
JP 5058339 B2 10/2012
(Continued)

*Primary Examiner* — Michael Andrews
(74) *Attorney, Agent, or Firm* — Foley & Lardner LLP

(57) ABSTRACT

A position detecting purpose permanent magnet 51 constituting a position detection sensor is installed at an opposite side to an output side of a rotational shaft 45 of a rotor housed within a motor housing 11A. A GMR element 56 which constitutes the position detection sensor and a position detection circuit thereof are installed on a side of a motor cover 48 on which a position detection purpose permanent magnet 51 is arranged. GMR element 56 is arranged on a position opposed against the position detection purpose permanent magnet. Thus, since the GMR element and the position detection purpose permanent magnet is installed, a mutually positioning assembly (attachment) accuracy can be improved. In addition, since the electric power conversion circuit and both of the GMR element and its position detection circuit are kept away, such an effect that an accurate detection signal can be obtained can be achieved.

15 Claims, 6 Drawing Sheets

(51) Int. Cl.
  *H02K 9/22* (2006.01)
  *G01D 5/14* (2006.01)
  *H02K 11/01* (2016.01)
  *B62D 5/04* (2006.01)
  *G01D 5/16* (2006.01)
  *G01L 5/22* (2006.01)
  *H02K 5/22* (2006.01)
  *H02K 11/22* (2016.01)
  *G01D 11/24* (2006.01)

(52) U.S. Cl.
  CPC ............ *G01D 5/145* (2013.01); *G01D 5/16* (2013.01); *G01L 5/221* (2013.01); *H02K 5/225* (2013.01); *H02K 9/22* (2013.01); *H02K 11/0141* (2020.08); *H02K 11/022* (2013.01); *H02K 11/33* (2016.01); *B62D 5/0424* (2013.01); *G01D 11/245* (2013.01); *H02K 2203/09* (2013.01); *H02K 2211/03* (2013.01)

(58) Field of Classification Search
  CPC ........... H02K 2203/09; H02K 2211/03; B62D 5/0406; B62D 5/0481; G01D 5/16; G01L 5/221
  USPC .......................................................... 310/71
  See application file for complete search history.

(56) References Cited

U.S. PATENT DOCUMENTS

| | | |
|---|---|---|
| 2012/0104886 A1 | 5/2012 | Yamasaki et al. |
| 2012/0161590 A1* | 6/2012 | Yamasaki ............. H02K 5/225 |
| | | 310/68 B |
| 2013/0062137 A1 | 3/2013 | Motoda |
| 2015/0333600 A1* | 11/2015 | Nakano ................. H02K 11/33 |
| | | 310/71 |

FOREIGN PATENT DOCUMENTS

| | | |
|---|---|---|
| JP | 2013-060119 A | 4/2013 |
| JP | 2014-183674 A | 9/2014 |
| WO | WO-2009/030350 A2 | 3/2009 |
| WO | WO-2014/054098 A1 | 4/2014 |
| WO | WO-2015/083478 A1 | 6/2015 |

* cited by examiner

ELECTRIC DRIVE DEVICE AND ELECTRIC POWER STEERING DEVICE

TECHNICAL FIELD

The present invention relates to an electrically-driven drive apparatus and an electrically-driven power steering apparatus and more particularly relates to the electrically-driven drive apparatus and the electrically-driven power steering apparatus into which an electronic control unit is incorporated.

BACKGROUND ART

In a general industrial machine field, it is a normal practice that an electrically-driven motor is used to drive a mechanical (system) control element. In recent years, such an electromechanical integration type electrically-driven drive apparatus that an electronic control apparatus constituting semiconductor elements is used for controlling a rotation speed of the electrically-driven motor and the rotation torque is integrally assembled to the electrically-driven motor, namely, so-called, an electromechanical integration type electrically-driven drive apparatus is started to be adopted.

As one of the electromechanical integration type electrically-driven drive apparatuses, an electrically-driven power steering apparatus for an automotive vehicle is exemplified. In this power steering apparatus, a turning direction and a turning torque of a steering shaft which is pivoted (turned) by operating a steering wheel with a driver are detected and the electrically-driven motor is driven so as to be turned (pivoted) in the same direction of the detected steering shaft turning direction and torque to generate a steering assistance torque. In order to control this electrically-driven motor, an electronic control unit (ECU: Electronic Control Unit) is installed in the power steering apparatus.

A conventional electrically-driven power steering apparatus is exemplified in a Japanese Patent Application Laid-open Publication No. 2013-60119 (Patent document 1). Patent document 1 describes an electrically-driven power steering apparatus constituted by the electrically-driven motor and the electrically-driven power steering apparatus. Then, the electrically-driven motor is housed in a motor housing having a cylindrical section made of aluminum alloy or so forth and an electronic control unit is housed in an ECU housing arranged at an opposite side to an output shaft in an axial direction of the motor housing. The electronic control unit housed in an inner side of the ECU housing and includes an electric power conversion circuit having power switching elements such as MOSFETs, IGBTs, or so forth drivingly controlling the electrically-driven motor and a control circuit section controlling such power switching elements as described above. An output terminal of each power switching element and an input terminal of each power switching element are electrically connected via bus bars.

Then, an electric power is supplied from a power supply via a connector terminal assembly made of a synthetic resin and the detection signals such as indicating driving states and so forth are supplied from detection sensors and so forth. The connector terminal assembly body functions as a lid body and is connected to an electronic control unit so as to enclose an opening section formed on the ECU housing and fixture bolts serve to be fixed on an outer surface of the ECU housing.

It should be noted that, as an electrically-driven drive apparatus to which the electronic control unit is integrated, an electrically-driven hydraulic control unit for various types of hydraulic control purpose such as an electrically-driven brake or so forth is known. In the following description, an electrically-driven power steering apparatus will representatively be explained.

PRE-PUBLISHED DOCUMENT

Patent document 1: Japanese Patent Application Laid-open Publication No. 2013-06119.

DISCLOSURE OF THE INVENTION

Problem to be Solved by the Invention

The electrically-driven motor used in the electrically-driven power steering system described above is a three phase direct current electrically-driven motor and it is necessary to need an information on a magnetic pole position of a rotor in order to drive the electrically-driven motor. Therefore, a positioning detection sensor constituted by a combination of a permanent magnet fixed on the rotational shaft of the electrically-driven motor and a Hall effect IC, or so forth fixed onto the rotational shaft of the electrically-driven motor is used. An attachment structure of the positioning detection sensor of such an electrically-driven power steering apparatus as described above is, generally, shown in FIG. 10.

In FIG. 10, a reference numeral 90 denotes a motor housing constituting the electrically-driven motor and a rotational shaft 91 is installed within an inside of the motor housing. A rotor (not shown) into which a permanent magnet is buried is fixed to rotational shaft 91. The rotor is rotated in response to a magnetic field generated by a stator (not shown) onto which a winding is wound. A magnet holding member 92 is fixed to an opposite side to an output side of rotational shaft 91. A position detection purpose permanent magnet 93 is housed in an inside of magnet holding member 92.

The electronic control unit housed in an inside of the ECU housing (not shown) includes: a power supply circuit section (not shown); an electric power conversion circuit section (not shown) having power switching elements such as MOSFETs or IGBTs to drivingly control the electrically-driven motor; and a control circuit section 94 controlling the power switching elements. Control circuit section 94 is fixed to fixture projections 95 via bolts 96. In addition, a GMR (Giant Magneto resistive effect) element 97 and its position detection circuit (not shown) are installed on a part of a surface of control circuit section 94 which is located at a position of control circuit section 94 opposed against position detection purpose permanent magnet 93 of rotational shaft 91.

Hence, position detection purpose permanent magnet 93 is rotated in response to the rotation of rotational shaft 91 and a rotational position of position detection purpose permanent magnet 93 is detected by GMR element 97 to obtain a magnetic pole position information of the rotor. An attachment structure of the position detection sensor described above and a detection method of the magnetic pole position information are well known.

Then, as shown in FIG. 10, position detection purpose permanent magnet 93 forming the position detection sensor is installed at motor housing 90 side and GMR element 97 and its position detection circuit are installed in the ECU housing.

However, when constituting parts (components) of the position detection sensor are attached onto the housings by dividing these parts into the motor housing and the ECU housing, such a problem that a positional assembly (attachment) accuracy of the position detection sensor is reduced and an accurate detection signal cannot be obtained occurs. Furthermore, such a problem that, since GMR element 97 and the position detection circuit are installed on control circuit section 94, a distance of each of GMR element 97 and the position detection circuit from the electric power conversion circuit comes near, an influence of switching noises of the electric power conversion circuit is received and the accurate detection signal cannot be obtained occurs.

It should be noted that the GMR element is an example of position detection elements and the present invention which will, hereinafter, be described is not limited to the GMR element and many magneto resistive effect (type) elements can be used.

It is an object of the present invention to provide novel electrically-driven drive apparatus and electrically-driven power steering apparatus which improve an assembly (attachment) accuracy of the position detection sensor and the magneto resistive effect element and the position detection circuit are not susceptible to an influence of switching noises of the electric power conversion circuit. It should be noted that, in the following description, the magneto resistive effect element includes the GMR element and the other same type element.

Means for Solving the Problem

A feature of the present invention is that a position detection purpose permanent magnet constituting a position detection sensor is installed at an opposite side to an output side of a rotational shaft of a rotor housed within the motor housing, a magneto resistive effect element constituting a position detection sensor and its position detection circuit are installed in a side of a motor cover in which the position detection purpose permanent magnet are installed, and the magneto resistive effect element is arranged at a position opposed against the position detection purpose permanent magnet.

Effect of the Invention

According to the present invention, since the magneto resistive effect element constituting the position detection sensor and the position detection circuit are arranged in a motor cover which is the side on which the position detection purpose permanent magnet is installed, a mutual positional assembly (attachment) accuracy can be improved and, since the electric power conversion circuit section and the magneto resistive effect element and its position detection circuit are kept away as compared with a control circuit section, an accurate detection signal with less influence of the switching noises can be obtained.

EMBODIMENT FOR CARRYING OUT THE INVENTION

A detailed explanation of a preferred embodiment according to the present invention will be made using the accompanied drawings. The present invention is not limited to the preferred embodiment described below. Various modifications and application examples are included in a range of a technical concept of the present invention.

Figure 1:
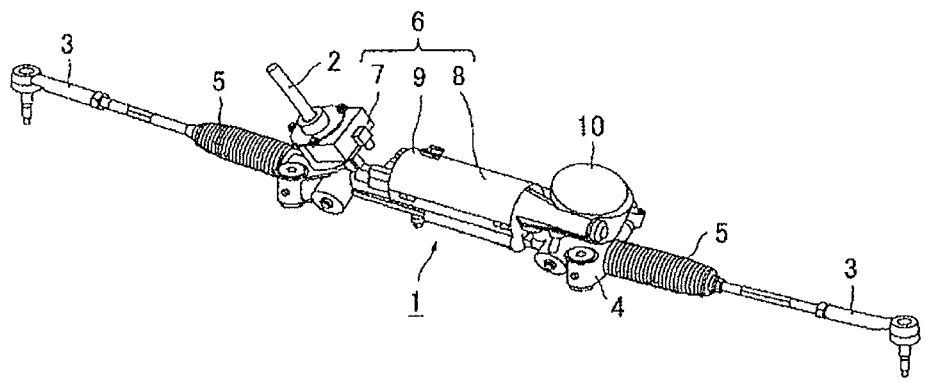
FIG. 1 is a whole perspective view of a steering system as one example to which the present invention is applied.
Figure 2:
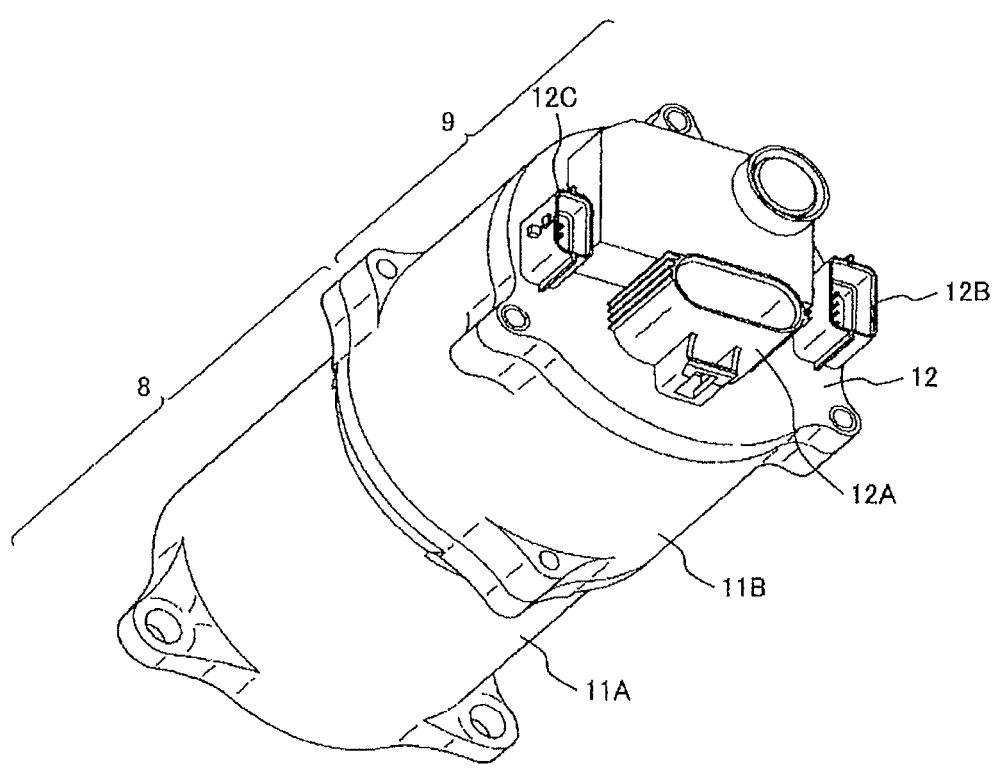
FIG. 2 is a whole perspective view of an electrically-driven power steering apparatus as an electrically-driven drive apparatus of an electromechanical (mechatronical)-integration type.

A structure of a steering system as one example of application to which the present invention is applicable and a structure of an electrically-driven power steering apparatus as an electrically-driven drive apparatus of a mechatronical (electromechanical) integration type will briefly be explained using FIGS. 1 and 2.

First, the steering system to steer front (road) wheels of an automotive vehicle will be explained. Steering system 1 is constituted as shown in FIG. 1. A pinion (not shown) is installed on a lower end of a steering shaft 2 linked with a steering wheel (not shown). This pinion is meshed with a rack (not shown) which is long in a vehicular body rightward-or-leftward direction. Tie rods 3 are linked to steer the front (road) wheels at both ends of this rack and the rack is covered with a rack housing 4. Rubber boots 5, 5 are disposed between respective rack housings 4, 4 and tie rods 3, 3.

An electrically-driven power steering apparatus 6 is installed to assist a torque when the steering wheel is rotationally operated. The electrically-driven motor includes: a torque sensor 7 which detects a turning (pivotal) direction and a turning (pivotal) torque of steering shaft 2; an electrically-driven motor section 8 which provides a steering assistance force for the rack via a gear 10 on a basis of the detection value of torque sensor 7; and an electronic control unit (ECU) section 9 which controls the electrically-driven motor arranged in electrically-driven motor section 8. Electrically-driven motor section 8 has three locations of an outer peripheral section of the output shaft side is connected to a gear 10 via bolts (not shown) and electronic control unit section 9 is disposed at an opposite side to the output shaft of electrically-driven motor section 8.

As shown in FIG. 2, electrically-driven motor section 8 is constituted by a motor housing 11A having a tubular section made of aluminum alloy or so forth and an electrically-driven motor (not shown) housed in this motor housing 11A.

Electronic control unit section 9 is constituted by an ECU housing 11B made of aluminum alloy or so forth and an electronic control assembly (not shown) housed within this ECU housing.

Both of motor housing 11A and ECU housing 11B have their mutually opposing end surfaces which are integrally fixed together with fixture bolts. The electronic control circuit assembly housed in an inside of motor housing 11B includes: a power supply circuit section generating a required power supply; an electronic power conversion circuit section having power switching elements such as MOSFETs drivingly controlling the electrically-driven motor section 8; and a control circuit section controlling the power switching elements.
Output terminals of the power switching elements and input terminals of the electrically-driven motor section 8 are electrically connected via a bus bar. It should herein be noted that the power supply circuit section, the electronic power conversion circuit section, and the control circuit section are divided and installed on mutually different three sheets of boards (substrates).

Figure 3:
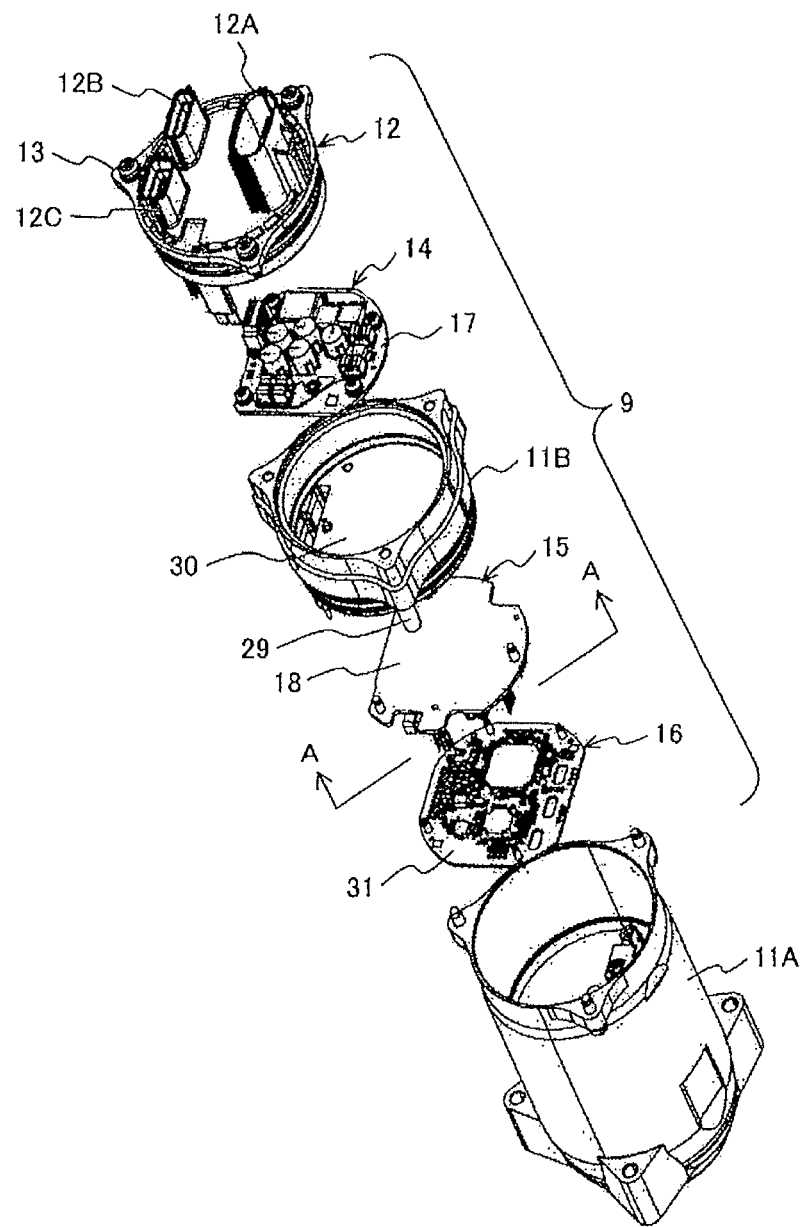
FIG. 3 is an exploded perspective view of the electrically-driven power steering apparatus in a preferred embodiment according to the present invention.

A lid body 12 made of synthetic resin serving as a connector terminal assembly is fixed through a fixture bolt 13 (refer to FIG. 3). Lid body 12 includes: a power supply purpose connector terminal formation section 12A; a detection sensor purpose connector terminal formation section 12B; a control state feed purpose connector terminal formation section 12C supplying a control state to an external equipment.

Then, in the case of the electronic control assembly housed in ECU housing 11B, the electronic power is supplied from the power supply via power supplying purpose connector terminal formation section 12A of lid body 12 made of the synthetic resin.
In addition, the detection signal such as the driving state and so forth is supplied from the detection sensor and so forth via detection sensor purpose connector terminal formation section 12B. A control state signal of the present electrically-driven power steering apparatus is supplied via a control state supplying purpose connector terminal formation section 12C.

It should herein be noted that lid body 12 is formed to enclose a whole of an opening section of ECU housing 11B. Each connector terminal may be formed in a miniature so as to be inserted into an insertion hole formed in ECU housing 11B and connected to the electronic control assembly.

When, in the electrically-driven power steering apparatus 6 as described above, the steering wheel is operated, steering shaft 2 is pivoted in either direction. At this time, torque sensor 7 detects the turning (pivoting) direction and the turning (pivoting) torque of steering shaft 2 and the control circuit section calculates a drive manipulated variable of the electrically-driven motor on a basis of these detection values. The electrically-driven motor is driven through the power switching elements of electric power conversion circuit section on a basis of this calculated drive manipulated variable. A rotational shaft of the electrically-driven motor is pivoted (turned) for steering shaft 2 to be driven in the same direction as the operating direction. The pivoting (turning) of the rotational shaft of the electrically-driven motor is transmitted to the rack (not shown) via gear 10 from the pinion (not shown) to steer the vehicle.
Since these structure and operations are already known, a more detailed explanation thereof will herein be omitted.

FIG. 3 shows an exploded perspective view of electrically-driven power steering apparatus 6. It should, herein, be noted that the electrically-driven motor is normally housed in motor housing 11A. Thus, as described above, both of motor housing 11A and ECU housing 11B are made of aluminum alloy and are separate bodies. Both housings may be formed as the same housing.

Electronic control unit section 9 includes: an ECU housing 11B coupled to an opposite side to a terminal section of the rotational shaft to which a pinion gear (not shown) of the electrically-driven motor within motor housing 11A; and lid body 12 coupled to ECU housing 11B via three fixture bolts 13. Lid body 12, as will be described later, serves to function as the connector terminal assembly and is formed through an injection molding from synthetic resin. It should be noted that various types of connector wiring sections are simultaneously buried into lid body 12 as will be described later.

Power supply circuit section 14 is installed in a housing space constituted by ECU housing 11B and lid body 12. Electrically power conversion circuit section 15 and control circuit section 16 are arranged in housing spaces of ECU housing 11B and motor housing 11A. Power supply circuit section 14, electric power conversion circuit section 15, and control circuit section 16 constitute the electronic control assembly.

A heat dissipation board 30 made of metal such as aluminum, aluminum alloy, or so forth is arranged within the inside of ECU housing 11B. This heat dissipation board 30 is integrally formed with ECU housing 11B. In addition, metal boards 17, 18 on which electric parts constituting power supply circuit section 14 and electric power conversion circuit section 15 are mounted are fixed to both surfaces of this heat dissipation board 30 through a single sided mounting.

As described hereinabove, heat dissipation board 30 made of aluminum or aluminum alloy having a predetermined thickness is arranged between metal board 17 and metal board 18. This heat dissipation board 30 functions as a heat dissipation member as will be described later. This heat dissipation is integrally formed within ECU housing 11B and heat can be radiated externally from ECU housing 11B. Concerning metal boards 17, 18 and heat dissipation function member 30, a heat radiation function member such as a heat dissipation adhesive, a heat radiation sheet, and a heat dissipation grease, or so forth having a thermal conductivity to enforce a thermal contact is interposed between metal boards 17, 18 and heat dissipation board 30.

A high voltage direct-current power supply used in an inverter unit to drive the electrically-driven motor and a power supply circuit section 14 which mainly functions as the generation of a low voltage direct current power supply used in the control circuit section such as a microcomputer or so forth are arranged.

Figure 4:
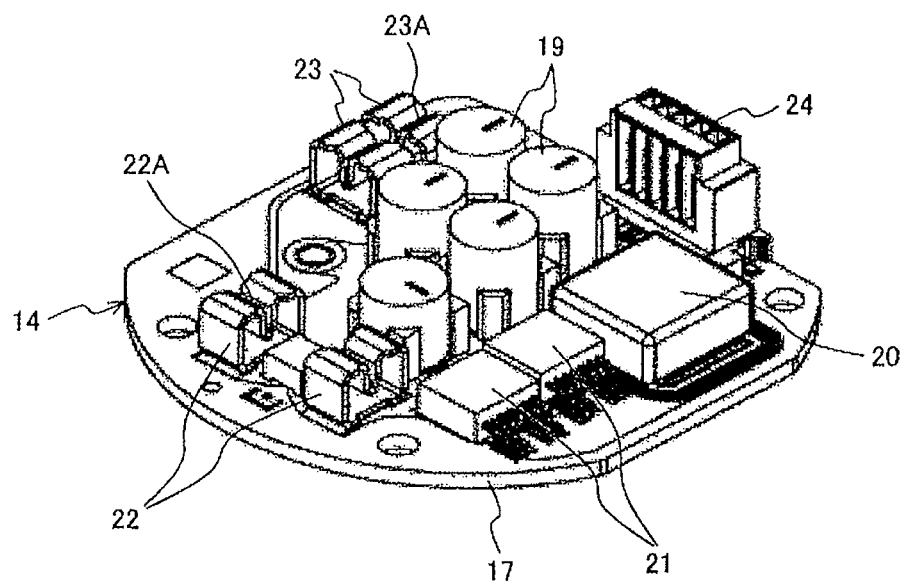
FIG. 4 is a perspective view of a power supply circuit section shown in FIG. 3.

This power supply circuit section 14, as shown in FIG. 4, electric parts such as capacitors 19, a coil 20, switching elements 21 of MOSFETs, a power supply side connector 22 to which a power supply side connector terminal is connected, a high voltage side connector 23 to which a high voltage power supply is supplied to electric power conversion circuit section 15, and a low voltage side connector 24 to which a low voltage side connector terminal to which a low pressure power supply is supplied are mounted.

On metal board 17, an insulation layer is formed on an aluminum board and a wiring pattern having a copper foil is printed over the insulation layer. Respective electrical parts are mounted on this wiring pattern and respective electrical parts are electrically connected. For power supply circuit section 14, the electrical parts having relatively large shapes (=tall) such as connectors 22 through 24 are used.

Connectors 22, 23 are connectors having press fit types such as connectors 22 through 24 and have elasticities faced toward an inner side thereof. Only by inserting the connector terminals into connectors 22, 23, a mutual connection can simply be secured without use of soldering. As described with respect to FIG. 4, connectors 22, 23 are formed in such a way that both ends of one sheet of elongated metal are folded into an inside thereof and this folded region thereof is folded twice to oppose both end surfaces against each other.

Then, the mutually opposing end surfaces have the elasticity and the connector terminal pressed into the mutually opposing surfaces is transmitted to metal board 17 via connectors 22, 23. In this embodiment, since metal board 17 is not fixed to heat dissipation board 30 through fixture screws. The pressing force provided from the connector terminal inserted into connectors 22, 23 fixes metal board 17 and heat dissipation board 30.

Electric power conversion circuit section 15 which executes an inverter control in which the drive of the electrically-driven motor is a main function is arranged at a side of the heat dissipation board 30 at which power supply circuit section 14 is placed. With this electric power conversion circuit section 15 as a boundary, metal board 18 of electric power conversion circuit section 15 is arranged so as to oppose against metal board 17 of electrical power supply circuit section 14.

Opposing surfaces between metal board 18 of this electric power conversion circuit section 15 and metal board 17 of this power supply circuit section 14 have the substantially same shapes. Heat is mutually transmitted to heat dissipation (radiation) board 30. Furthermore, a heat dissipation function material such as a heat dissipation adhesive, a heat dissipation sheet, a heat dissipation grease, or so forth, each having a good heat radiation capability is interposed between metal boards 17, 18 and heat dissipation (radiation) board 30.

Figure 5:
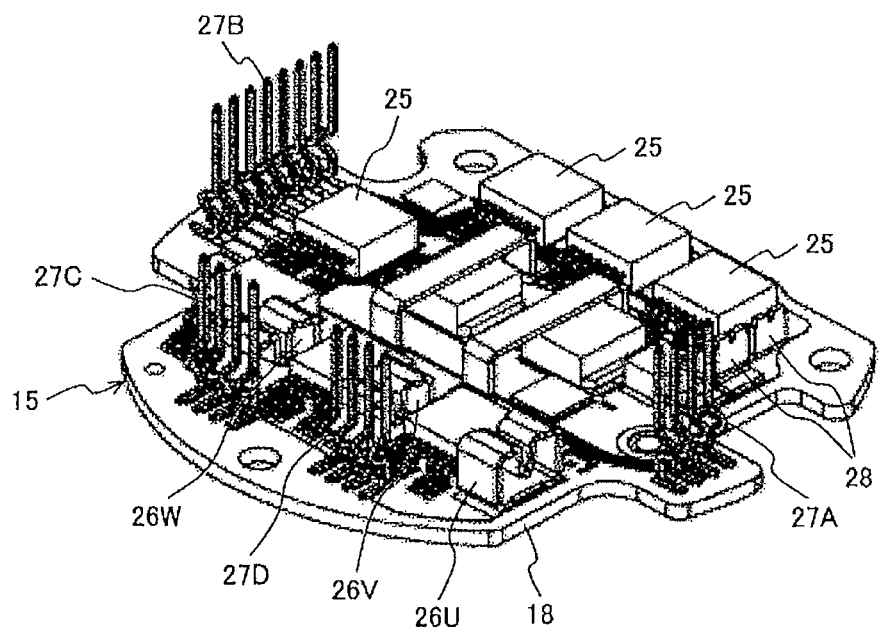
FIG. 5 is a perspective view of an electric power conversion circuit section shown in FIG. 3.

In electric power conversion circuit section 15, as shown in FIG. 5, power switching elements 25 having a plurality of MOSFETs or IGBTs, output purpose output terminals 26U, 26V, 26W to control switching elements 25, and output connector terminals 27A through 27D which serve as inputs of input signals to gates, drains, and sources to control switching elements 25 are mounted. In addition, an inverter side connector 28 for receiving the supply of electrical power from power supply circuit section 14 is also installed. In addition, switching elements 25 include fail-safe purpose three switching elements 25 other than six switching elements 25 controlling the electrically-driven motor.

It should be noted that output purpose connectors 26U, 26V, 26W are connectors of press fit types and have elasticities toward their inner sides. A mutual connection can simply be secured without use of soldering only by inserting bus bar connector terminals connected to these connectors 26U, 26V, 26W into these connectors 26U, 26V, 26W. As shown in FIG. 5, output purpose connectors 26U, 26V, 26W are formed in such a way that both ends of one sheet of elongated metal plates are folded into the inner side thereof and the folded region is folded twice so that the end surfaces of both folded regions are opposed against each other.

In the case of metal board 18, an insulation layer is formed on the aluminum board and a wiring pattern made of the copper foil is printed.

The electrical parts are mounted on the wiring pattern so that the respective parts are electrically interconnected. It should be noted that FIG. 5 shows a side of the board at which the above-described electrical parts are mounted in order to understand easily the electrical parts but, actually, as shown in FIG. 3, metal board 18 is arranged so that the electrical parts are faced toward a lower side.

Control circuit section 16 which has a main function of switching controls and so forth of switching elements 25 of electric power conversion circuit section 15 is arranged between electric power conversion circuit section 15 and a motor cover which will be described later fixed to motor housing 11A. Resin board attachment bosses 29 are formed onto ECU housing 11B to face toward motor housing 11A. A resin board 31 of control circuit section 16 is fixed to resin board attachment boss 29 via attachment bolts.

Figure 6:
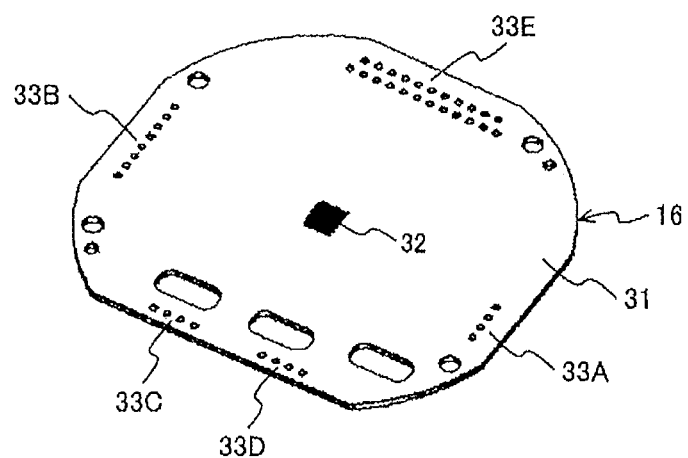
FIG. 6 is a perspective view of a control circuit section shown in FIG. 3.

In control circuit section 16, as shown in FIG. 6, a microcomputer 32 and so forth to control switching elements 25 and so forth are mounted on resin board 31 such as synthetic resin and so forth.

It should be noted that electronic parts such as a peripheral circuit and so forth are arranged on resin board 31, as shown in FIG. 3, but FIG. 6 omits these electronic parts.

Resin board 31 is arranged with a predetermined distance provided against electric power conversion circuit section 15. Electric parts of electric power conversion circuit section 15 and the electric parts of control circuit section 16 are arranged in a space between this board 31 and circuit section 15. Then, connector terminals 27A through 27D as described above serve to connect control circuit section 16 and electric power conversion circuit section 15.

Connector terminals 27A, 27B, 27C, 27D have lengths, each of the lengths exceeding the predetermined distance between resin board 31 and electric power conversion circuit section 15. Then, connector terminal 27A is connected to connection holes 33A. Then, a connector terminal 27A is connected to connection holes 33A of resin board 31, connector terminal 27B being connected to connection hole 33A of resin board 31, and connector terminal 27B being connected to connection hole 33B, and connector terminal 27C being connected to connection holes 33D.

It should be noted that signal transmission purpose and low voltage power supply purpose control side connector terminals buried into an insulation region section of lid body 12 as will be described later are connected to connection holes 33E formed on resin board 31.

In the way described above, lid body 12 is arranged, directing from lid body 12 toward motor housing 11A side, in an order of power supply circuit section 14, heat dissipation board 30, electrical power conversion circuit section 15, and control circuit section 16 toward motor housing 11A side. In this way, by arranging control circuit section 16 with a certain distance provided from power supply circuit section 14, a stable power supply can be provided for control circuit section 16 after an elimination of power supply noises.

Referring back to FIG. 3, lid body 12 into which a connector wiring section is buried encloses an opening of ECU housing 11B. In the same way as shown in FIG. 2, connector terminal formation section 12A for the power supply purpose, connector terminal formation section 12B for the detection sensor, and a connector terminal formation section 12C for the control state output (feeding) and transmission purpose to output and transmit (feed) the control state to the external equipment are equipped on the outer surface of ECU housing 11B. It should be noted that connector terminal formation section 12B and connector terminal formation section 12C may integrally be formed. Then, an electric power is supplied to power supply circuit section 14 via a power supply (not shown) via these connector terminal formation sections 12A through 12C. Similarly, signals or so forth of detection sensors are inputted to control circuit section 16.

Figure 7:
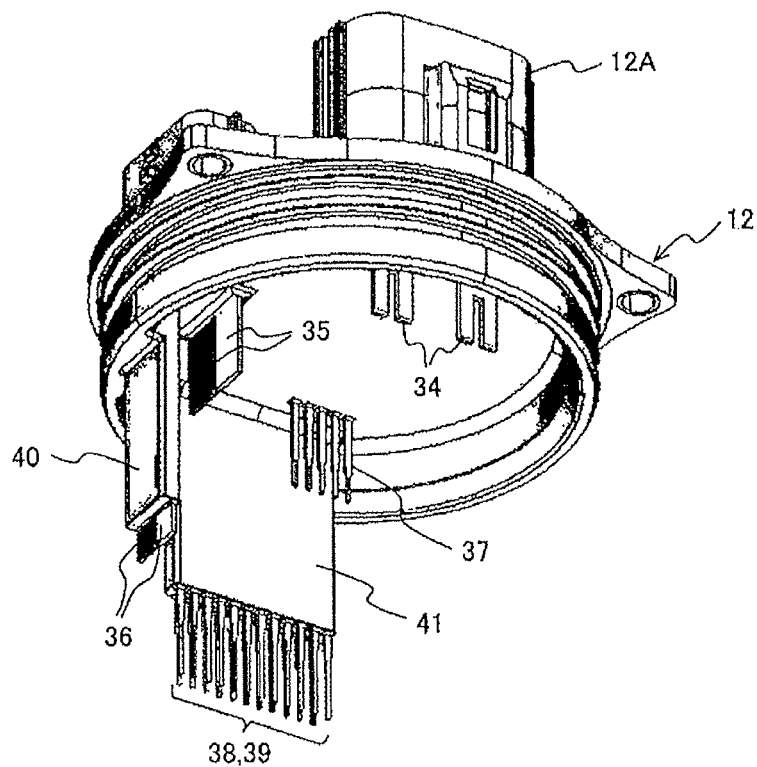
FIG. 7 is a perspective view of a lid body viewed from an obliquely lower side in which a connector terminal shown in FIG. 3 is equipped.

Next, the structure of lid body 12 will, herein, be explained. As shown in FIG. 7, lid body 12 is formed with the synthetic resin. This lid body 12 serves also as a connector terminal assembly and various connector wiring sections and their connector terminals are equipped in an inner side of lid body 12.

At first, connector terminal formation section 12A connected to an external power supply (=a vehicle mounted (in-vehicle) battery) and a power supply purpose connector wiring section are buried into lid body 12. A tip of power supply side connector terminal is exposed from lid body 12. A tip of power supply side connector terminal 34 is exposed from lid body 12. This power supply side connector terminal 34 is positioned at the inner side of a side peripheral surface of lid body 12.

Power supply side connector terminal 34 is connected to power supply side connector 22 of power supply circuit section 14. Only by inserting power supply side connector terminal 34 into power supply side connector 22 of the press fit type, the connection is easily completed. This power supply side connector 34 inserted into power supply side connector 22 has the function for metal board 17 to be strongly pressed against heat dissipation (radiation) board 30.

Next, a high voltage side connector wiring section which is an electric power supply purpose connector wiring section connected between power supply circuit section 14 and electric power conversion circuit section 15 are buried into lid body 12. Both ends of this high voltage side connector wiring section are formed as high voltage side connector terminal 35 and inverter side connector terminal 36 are exposed from lid body 12. One high voltage side connector terminal 35 is connected to high voltage side connector 23 of power supply side circuit section 14 and the other inverter side connector terminal 36 is connected to an inverter side connector 28 of electric power conversion circuit section 15.

A high voltage side connector terminal 35 is connected to high voltage side connector 23 of power supply circuit section 14. High voltage side connector terminal 35 can easily be connected to high voltage side connector 23 without use of soldering only by inserting high voltage side connector terminal 35 into press fit type high voltage side connector 23. This high voltage side connector terminal 35 has the function for metal board 17 to be strongly pressed against heat dissipation board 30.

The inverter side connector terminal is connected to inverter side connector 28 of electric power conversion circuit section 15 and the connection of inverter side connector terminals 36 and 28 is carried out by performing a TIG welding between inverter side connector terminal 36 and inverter side connector terminal 28 so that the connection is completed.

This high voltage side connector wiring section is formed in a Japanese letter of "コ" such that the cross sectional shape of inverter side connector terminal is longer than the high voltage side insulation region section 40 buried into the synthetic resin forming lid body 12. This high voltage side insulation region section 40 is inserted through insertion sections formed on metal boards 17, 18 and heat dissipation board 30 and extended to electric power conversion circuit section 15.

Next, a low voltage side connector wiring section which is a power supply purpose connector wiring section to connect power supply circuit section 14 and control circuit section 16 is buried into lid body 12. Both ends of the low voltage side connector wiring section are formed as a low voltage side connector terminal 37 and a control side connector terminal 38 and are exposed from lid body 12. One low voltage side connector terminal 37 is connected to low voltage side connector 24 of power supply section 14 and the other control side connector terminals 38 are connected to connection holes 33E of control circuit section 16.

Next, a signal transmission purpose signal transmission connector wiring section adjacent to the low voltage side connector wiring section via which a detection sensor purpose connector wiring section and a control state feeding (output and supplying) connector terminal formation section 12C are buried into solid body 12. Then, control purpose connector terminal 39 is exposed from lid body 12.

Low voltage side connector terminal 37 is connected to low voltage side connector 24 of power supply circuit section 14. The connection between low voltage side connector 24 of power supply circuit section 14. The connection between low voltage side connector terminal 37 and low voltage side connector 24 is completed only by fitting low voltage side connector terminal into low voltage side connector 24 of a socket type. In addition, control side connector terminal 38 and signal transmission purpose control side connector terminal 39 are connected to connection holes 33E of control circuit section 16. The connection is completed by joining control side connector terminals 38, 39 with connection holes 33E by the soldering.

The above-described low voltage side connector wiring section and the signal transmission connector wiring section and signal transmission connector wiring section provide low voltage side insulation region section 41 buried into synthetic resin forming lid body 12. This low voltage side insulation region section 41 is inserted into insertion sections formed on the outer peripheral side end surface of metal boards 17, 18.

It should be noted that, as shown in FIG. 7, on the outer peripheral side of each board of power supply circuit section 14, electric power conversion circuit section 15, and control circuit section 16, high voltage side connector terminal 35, inverter side connector terminal 36, low voltage side connector terminal 37, control side connector terminal, and control side connector terminal 39 are positioned.

Thus, since the electrical parts constituting power supply circuit section 14, electric power conversion circuit section 15, and control circuit section 16 can be positioned toward the center of each board, a miniaturization toward a radial direction of each board can be achieved.

It should be noted that the order to assemble the electrically-driven power steering apparatus constituting power supply circuit section 14, electric power conversion circuit section 15, and control circuit section 16 shown in FIG. 3 is as follows:

At first, metal boards 17, 18 are opposed against heat dissipation board (substrate) 30 and, in this state, lid body 12 is fixed to ECU housing 11B. At this time, with power supply side connector terminal 34 inserted into power supply side connector 22 and high voltage side connector terminal 34 into power supply side connector 22, metal board 17 is pressed against heat dissipation board (substrate) 30 and is fixed thereto. It should be noted that, in some cases, it is possible to press metal board 17 into heat dissipation board (substrate) 30 with low voltage side connector terminal 37 inserted into low voltage side connector 24.

Hence, in this state, the connection between power supply side connector 22 of power supply circuit section 14 and power supply side connector terminal 34 is completed. In addition, the connection between power supply side connector 22 of power supply circuit section 14 and power supply side connector terminal 34 is completed. Furthermore, the connection between low voltage side connector 24 and low voltage side connector terminal is completed.

Next, metal board 18 of electric power conversion circuit section 15 is fixed onto heat dissipation (radiation) board (substrate) 30 with the fixture screws and power supply circuit section 14, electric power conversion section 15, and heat dissipation substrate 30 are integrated together. Since, in this state, high voltage side insulation region section 40 is projected from electric power conversion circuit section 15, inverter side connector 28 are joined using a TIG welding purpose torch.

Next, fixture bolts are inserted through control circuit section 16 and are drilled into heat dissipation board (substrate) 30 and control circuit section 11 and ECU housing are integrated together. Since, in this state, each connection hole 33A through 33E formed on resin board 31 of control circuit section 16 and corresponding respective connector terminals 27A through 27D, 34, and 35 are soldered and joined. In this way, electronic control unit section 9 is completed.

Then, utilizing attachment flanges formed on ECU housing 11B, electronic control unit section 9 is fixed to motor housing 11A with fixture bolts so that motor housing 11A and ECU housing 11B are integrated together.

Figure 10:
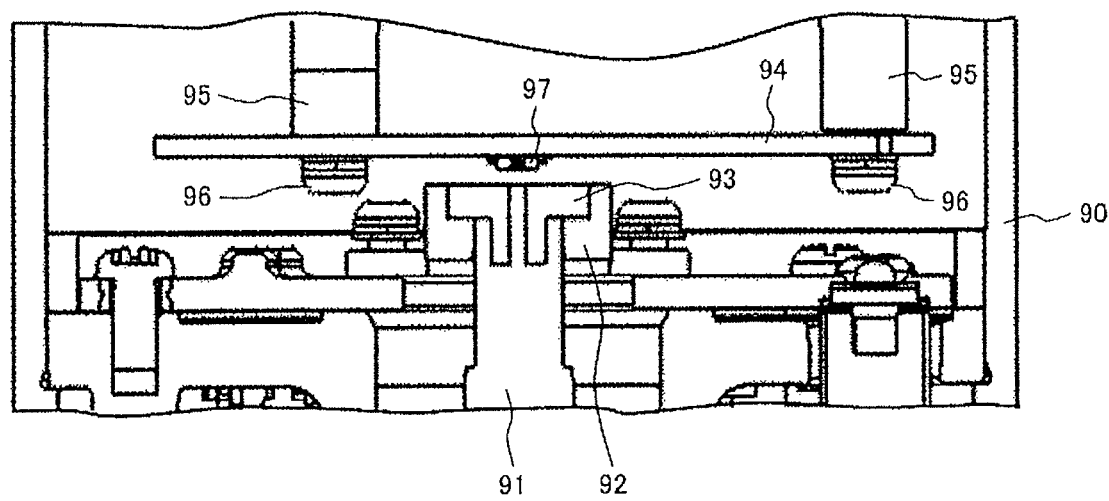
FIG. 10 is an expanded cross sectional view representing the attachment structure of a conventional position detection sensor.

As described hereinabove, the attachment structure of the conventional position detection sensor, as shown in FIG. 10, position detection purpose permanent magnet 93 forming the position detection sensor are installed in motor housing 90 side and GMR element 97 and its position detection circuit are installed in the ECU housing. In this way, when constituents parts of the position detection sensor are divided into the motor housing and the ECU housing and a positional assembly (attachment) accuracy of the position detection sensor is reduced and an accurate detection signal cannot be obtained. Furthermore, since GMR element 97 and the position detection circuit are installed within the control circuit section, distances of GMR element 97 and the position detection circuit from the electric power convention circuit become near. Thus, the GMR element and the position detection circuit are susceptible to the influence of switching noises of the electrical power conversion circuit section and an accurate detection signal cannot be obtained.

Therefore, in this embodiment, a position detection purpose permanent magnet constituting the position detection sensor is installed on an opposite side to an output side of a rotational shaft of the rotor housed in the motor housing. Furthermore, the magneto resistive effect element is arranged at a position opposite to the position detection purpose permanent magnet.

Since, according to the structure in this embodiment, the magneto resistive effect (type) element constituting the position detection sensor and the position detection circuit are arranged on a side of the motor cover at which the position detection purpose permanent magnet is arranged, a mutual positional assembly (attachment) accuracy can be improved.

In addition, since the distances of the electric power conversion circuit section from the magneto resistive effect (type) element and the positon detection circuit are remotely separate as compared with those of the control circuit section, an effect such that an accurate detection signal with an ill effect of switching noise is reduced and an accurate detection signal can be achieved.

Next, a whole structure of an electrically-driven power steering apparatus in which the above-described structure is adopted will be explained on a basis of FIGS. 8 and 9. It should be noted that FIG. 9 shows a cross sectional view in which a part of the position detection sensor is expanded.

Figure 8:
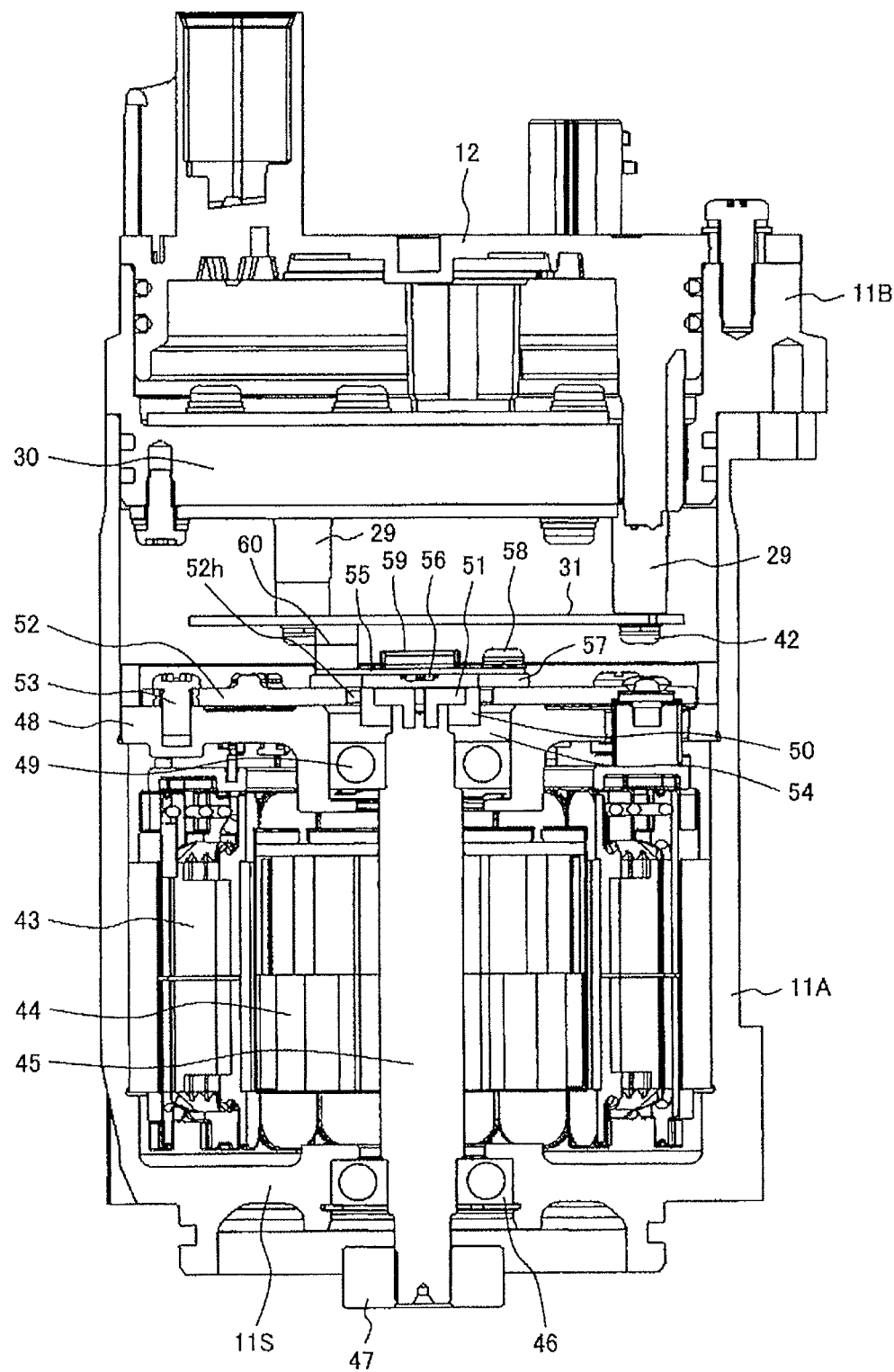
FIG. 8 is a longitudinal cross sectional view representing the electrically-driven power steering apparatus shown in FIG. 3.
Figure 9:
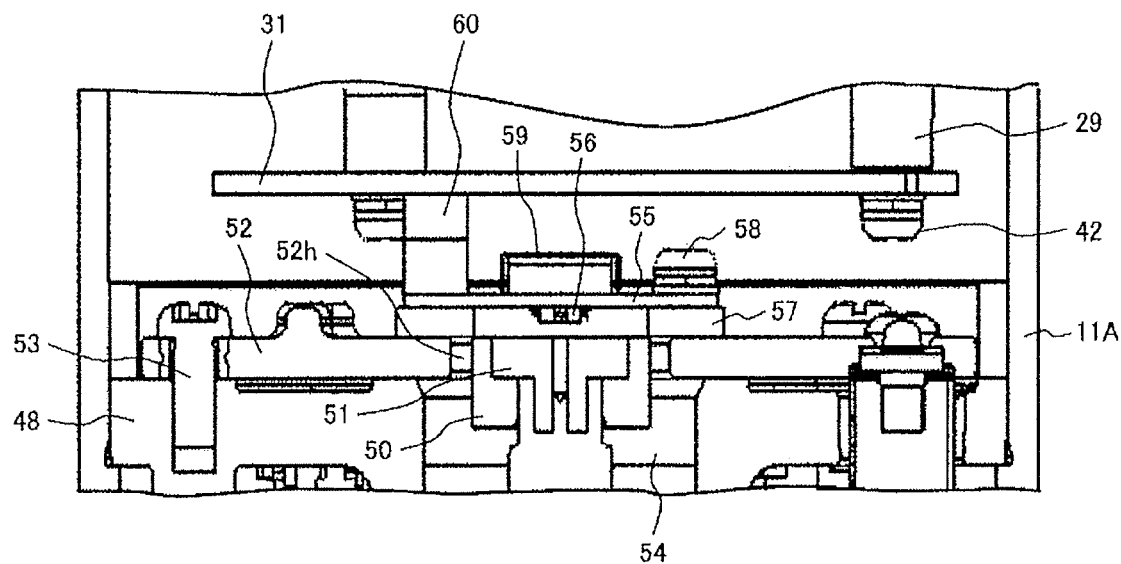
FIG. 9 is an essential part expanded cross sectional view representing an attachment structure of a position detection sensor shown in FIG. 8.

In FIGS. 8 and 9, a plurality of fixture means such as bolts and so forth are used to fix motor housing 11A, ECU housing 11B, and lid body 12 to be integrated together. Lid body 12 is fixed, within ECU housing 11B. Power supply circuit section 14 is arranged in a space between motor cover 48 and ECU housing 11B and lid body 12. Electric power conversion circuit section 15 and control circuit section 16 are arranged in a space between motor cover 48 fixed to motor housing 11A. In should be noted that, in FIG. 8, detailed structures of power supply circuit section 14, electric power conversion circuit section 15, and control circuit section 16 (describing only the resin board) are omitted but actually the detailed structure thereof is shown in FIG. 3.

A resin board (substrate) 31 constituting control circuit section 16 is fixed to resin board attachment bosses 29 formed in ECU housing 11B through bolts 42. A microcomputer 32 and its peripheral circuit are mounted on resin board 31. It should be noted that this resin board 31 is different from that shown in FIG. 10 and position detection circuit and the GMR element are not mounted thereon. Hence, since other electronic parts can be mounted accordingly, a mounting efficiency of resin board 31 can be increased.

A annular stator 43 onto the inside of which a winding is wound is fixed to the inside of motor housing 11A. A rotor 44 into which permanent magnets are buried is rotatably arranged into the inside of stator 43. A rotational force of rotor 44 is provided through a magnetic field generated by the winding of stator 31.

Rotational shaft 45 is pressed into a center of rotor 44 and is fixed thereto so that rotational shaft 45 is integrally rotated by the rotation of rotor 44. An output end of rotational shaft 45 is rotatably axial-supported by means of ball bearings 46 fixed to side walls 11S of motor housing 11A. A pinion gear 47 is fixed to an output end of rotational shaft 45. A movement of the rack is assisted by this pinion gear 47.

Motor cover 48 is pressed into an opposite side to a side wall 11S of motor housing 11A and this motor cover 48 is preferably fixed to motor housing 11A through the bolts. Hence, stator 43 and rotor 44 are arranged into the space between side wall 11S of motor housing 11A and motor cover 48.

It should be noted that motor cover 48 can integrally be formed with motor housing 11A in the same way as side wall 11S of motor housing 11A. In this case, side wall 11S of motor housing 11A is formed in a separate body and is fixed to motor housing 11A through the bolts. Hence, motor cover 48 is positioned at an opposite side to the output end of rotational shaft 45 and have the meaning of the formation of a space in which stator 43 and rotor 44 are arranged.

A ball bearing 49 is fixed to a center of motor cover 48 and a terminal section of rotational shaft 45 opposite to the output end to which pinion gear 47 of rotational shaft 45 is journaled. Hence, rotational shaft 45 is axially supported on ball bearing 46 and ball bearing 49 to enable a rotation thereof.

In addition, a magnet holding member 50 is fixed to the terminal section of rotational shaft 45 which is an opposite side to the other terminal section of rotational shaft 45 to which pinion gear 47 is fixed and position detection purpose permanent magnet 51 constituting the position detection sensor is housed in the inside of magnet holding member 50. This position detection purpose permanent magnet 51 is already magnetized for a plurality of unit magnets to annularly be formed.

A bus bar 52 is fixed onto a surface of motor cover 48 at a side of ECU housing 11B and serves to connect electric power conversion circuit section 15 and the winding of stator 43. An outer periphery of bus bar 52 is enclosed with synthetic resin to secure an electrical insulation and this bus bar 52 is fixed via a bolt 53 to motor cover 48.

In addition, a hole section 52h is formed on the center of bus bar 52 and a magnet holding member 50 is housed in hole section 52h. Furthermore, a housing recess section 54 is formed on motor cover 48, a ball bearing 49 is housed in housing recess section 54 and a part of magnet holding member 50 is housed in the same housing recess section. Hence, as compared with the conventional structure shown in FIG. 10, an axial length of rotational shaft 45 can be shortened. This is because position detection board 55, as will be described later, is arranged at motor cover 48 side. Thus, such a structure as described above can be taken.

Furthermore, on a surface of motor cover 48 which faces toward ECU housing 11B side, a GMR (Giant Magneto Resistive effect) (type) element 56 which is one of the magneto resistive effect (type) elements and is constituting the position detection sensor and a position detection board 55 in which a position detection circuit (not shown) detecting and calculating a magnetic pole position from the detection signal of this GMR element 56 are mounted. GMR element 56 has a function to detect the magnetic pole position information of rotor 44 in cooperation with position detection purpose permanent magnet 51. It should, herein, be noted that the microcomputer and its peripheral circuit may be used for the position detection circuit. However, only an amplifying circuit may be used which amplifies the magnetic pole information signal of GMR element 56. In this case, the amplified signal is transmitted to control circuit section 16 and control circuit section 16 calculates the magnetic pole position, Then, position detection board 55 is made of the resin board and is fixed to a detection board attachment boss 57 through a bolt 58. Position detection board 55 is arranged to enclose position detection purpose permanent magnet 51 from an upper side in a state shown in the drawings (FIG. 8). In this way, the space in which the electrically-driven motor is arranged in cooperation with motor cover 48 can liquid tightly or air tightly (hermetically) shielded against the space in which the electronic control apparatus is arranged.

In addition, it is possible to integrally form detection board attachment boss 57 with the synthetic resin of bus bar 52. It is also possible to form annularly position detection board 55 circularly to attach position detection board 55 onto detection board attachment boss 57. In this case, it is also possible to shield liquid tightly or air tightly (hermetically) against the space into which the electronic control unit is arranged.
In this way, position detection board 55 is directly fixed to motor cover 48 or is indirectly fixed to motor cover 48 via bus bar 52.

Hence, invaded moisture transmitted through rotational shaft 45 can be shielded from being moved into ECU housing 11B and an ill influence due to the moisture can be suppressed to be given to the electronic parts housed in ECU housing 11B. It is also possible to suppress moisture dust generate due to the rotation of the electrically-driven motor from invading into ECU housing 11B. Thus, such an effect that the failure of the electronic parts can be avoided can be achieved.

In addition, GMR element 56 is mounted on a surface of a position detection purpose permanent magnet 61 side of position detection purpose permanent magnet 51 and is arranged on a position opposite to position detection permanent magnet 51. Hence, GMR element 56 is integrally mounted on the surface of the position of position detection board 55 which faces toward position detection purpose permanent magnet 51 and arranged on a position facing against position detection purpose permanent magnet 51. Hence, the position detection sensor is integrally assembled within motor housing 11A. That is, since rotational shaft 45 fixed to position detection purpose permanent magnet 51 is supported by motor cover 48. Position detection board 55 on which GMR element 56 is mounted is fixed to motor cover 48 or bas bar 52 (this is fixed to the motor cover).

Therefore, positions of position detection purpose permanent magnet 51 and position detection board 55 are determined via motor cover 48. The assembly (attachment) accuracy of the position detection sensor can be improved and an accurate detection signal can be obtained.

In addition, since position detection board 55 is mounted on motor cover 48 or bus bar 52, position detection purpose permanent magnet 51 can accordingly be shifted toward rotor 44 side and the length of rotational shaft 45 to hold position detection purpose permanent magnet 51 can be shortened.

A magnetic shield plate 59 is attached onto an ECU housing 11B side of position detection board 55. This magnetic shield plate 59 is made of an iron-based metal and has a function to suppress the ill influence of switching noises generated in electric power conversion circuit section 15 on GMR element 56 and the position detection circuit. A projection area of magnetic shield plate 59 toward GMR element 56 side is set to a width equal to or wider than the area including GMR element 56 and this reduces the influence of the switching noises toward GMR element 56. It should be noted that, since magnetic shield plate 59 is positioned in a space between position detection board 55 and resin board 31 of control circuit section 16, a space utility rate becomes favorable. This can contribute on the miniaturization of the products.

In addition, since position detection board 55 is assembled to motor cover 48 or bas bar 52, a distance from position detection board 55 to electric power conversion circuit section 15 becomes long and the switching noises generated in electric power conversion circuit section 15 can be suppressed to give the influence on GMR element 56. For example, as shown in FIG. 10, when GMR element 56 and position detection circuit are installed in GMR element 51 and the position detection circuit are installed in control circuit section 16, such a task in which a distance between control circuit section 16 and electric power conversion circuit section 15 becomes short and easily receives the influence of the switching noises.

Then, the magnetic pole information detected by position detection board 55 is transmitted to control circuit section 16. Control circuit section 16 controls power on interval times of MOSFETs in electric power conversion circuit section 15. Hence, it is necessary to connect position detection board 55 and control circuit section 16 via signal lines. Therefore, in this embodiment, a floating converter 60 is used to connect position detection board 55 and control circuit section 16.

Floating connector 60 is a connector in which a mechanism (a floating mechanism) which absorbs longitudinal and lateral errors generated when the connector is mounted in the board. Floating connector 60 can increase the assembly (attachment) accuracy of the board by absorbing errors and positional "deviations". In this embodiment, floating connector 60 is used for a board-versus-board connector. If this floating connector 60 is used, the connection of a harness is not needed. Hence, an assembly step can be simplified and a production cost can be reduced. In addition, since floating connector 60 is positioned in the space between position detection board 55 and resin board 31 of control circuit section 16, a space utility rate becomes favorable. This can contribute on the miniaturization of product.

It should be noted that, in the embodiment described above, heat dissipation board 30 is installed in the ECU housing and power supply circuit section 14 and electric power conversion circuit section 15 are fixed on both surfaces of this heat dissipation board 30. However, metal boards of power supply circuit 14 and electric power conversion circuit section 15 may directly be cohered together without installation of heat dissipation board 30. In this case, the metal boards play a role of the heat dissipation board.

In addition, it is possible to mount only GMR element 56 on position detection board 55 and to position the position detection circuit on control circuit section 16. Furthermore, such a magneto resistive effect (type) elements such as an AMR element or a TMR element may be used in place of GMR element 56.

According to the present invention, as described hereinabove, the position detection purpose permanent magnet constituting the position detection sensor is installed at the end side opposite to the output side of the rotational shaft of the rotor housed in the motor housing and the magneto resistive effect (type) element and the position detection circuit are installed in the motor cover. In addition, the magnetoresistance effect (type) element is arranged at a position opposed against position detection purpose permanent magnet.

Thus, as described above, since the position detection purpose permanent magnet and the magneto resistive effect (type) element constituting the position detection sensor and the position detection circuit are arranged within the motor housing, a mutual positional assembly (attachment) accuracy can be improved. In addition, since the distances of electric power conversion circuit section from the magneto resistive effect (type) element and the position detection circuit are relatively long (kept away), such an effect that an accurate detection signal can be obtained.

It should, herein, be noted that the present invention is not limited to the above-described embodiment and various modifications are included. For example, the above-described embodiment has been explained in details in order to easily understand the present invention. Another embodiment in which the whole structure explained above is included is not always limited.

In addition, it is possible to replace a part of structure in a certain embodiment with the structure of another embodiment and it is possible to add the structure of the embodiment to the structure of the certain embodiment. In addition, it is possible to add, delete, and substitute the other structure for a part of the structure of each embodiment.

As the electrically-driven drive apparatus based on the preferred embodiment described hereinabove, the following aspects as will be described below are considered.

That is, in one aspect, the electrically-driven drive apparatus comprises: an electrically-driven motor, housed within a motor housing space formed by a motor housing and a motor cover, having a rotor and a stator; an ECU housing, coupled to the motor housing, for forming an ECU housing space between the ECU housing and the motor cover; an electronic control unit, housed in the ECU housing space between the ECU housing and the motor cover, for performing a driving control for the electrically-driven motor; a position detection purpose permanent magnet installed on a rotational shaft of the electrically-driven motor axially supported on the motor cover; and a position detection board directly or indirectly attached to the motor cover and on which a magneto resistive effect element detecting a magnet pole information signal of the rotor in cooperation with the position detection purpose permanent magnet is mounted.

In a preferable aspect of the electrically-driven drive apparatus, on the position detection board, either an amplifying circuit that amplifies the magnetic pole information signal of the magneto resistive effect element or a microcomputer and its peripheral circuit having a calculation function to calculate a magnetic pole information from the magnetic pole information signal of the magneto resistive effect element is mounted.

In another preferable aspect, in either of the electrically-driven drive apparatus, the electronic control unit includes: a power supply circuit section; an electric power conversion circuit section; and a control circuit section, a bus bar is fixed to the motor cover for connecting a winding of the stator to the electric power conversion circuit section, and the position detection board is fixed to an attachment boss installed on the bus bar or fixed to another attachment boss installed on the motor cover.

In a further another aspect, in any one of the aspects of the electrically-driven drive apparatus, the electronic control unit is arranged in an order of the control circuit section, the electric power conversion circuit section, and the power supply circuit section, as viewed from motor cover, and the position detection board is arranged between the control circuit section and the motor cover.

In a still another aspect, in any one of the aspects of the electrically-driven drive apparatus, the position detection purpose permanent magnet is attached to a terminal section of the rotational shaft, the magneto resistive effect element is mounted on the position detection board at a position opposed against the position detection purpose permanent magnet, and, furthermore, the motor housing space and the ECU housing space are shielded by the motor cover, the bus bar, and the position detection board.

In a further another aspect, in any one of the above-described aspects of the electrically-driven drive apparatus, the position detection purpose permanent magnet is attached to a terminal section of the rotational shaft, the magneto resistive effect element is mounted on the position detection board at a position opposed against the position detection purpose permanent magnet, and, furthermore, the motor housing space and the ECU housing space are shielded by the motor cover, the bus bar, and the position detection board.

In a further another aspect, in any one of the above-described aspects of the electrically-driven drive apparatus, the position detection purpose permanent magnet is attached to a terminal section of the rotational shaft, the magneto resistive effect element is mounted on the position detection board at a position opposed against the position detection purpose permanent magnet, and, furthermore, a magnetic shield plate is mounted on a surface of an opposite side to the position detection board on which the magneto resistive effect element is arranged.

In a still another aspect, in any one of the above-described aspects of the electrically-driven drive apparatus, the position detection purpose permanent magnet is attached to a terminal section of the rotational shaft, the magneto resistive effect element is mounted on the position detection board at a position opposed against the position detection purpose permanent magnet, and, furthermore, the position detection board and a board on which the control circuit section is mounted are connected together via a floating connector and the magnetic pole information signal or the magnetic pole information is transmitted to the control circuit section.

In addition, in an electrically-driven power steering apparatus based on the preferred embodiment which has been described before, the following aspects are, for example, considered.

That is, the electrically-driven power steering apparatus comprising: an electrically-driven motor, housed within a motor housing space formed by a motor housing and a motor cover, for providing a steering assistance force for a steering shaft; an ECU housing, coupled to the motor housing, for forming an ECU housing space between the ECU housing and the motor cover; an electronic control unit, housed in the ECU housing space between the ECU housing and the motor cover, for at least detecting a turning direction and a turning torque of a steering shaft of an automotive vehicle through a torque sensor and for calculating a drive manipulated variable of the electrically-driven motor; a position detection purpose permanent magnet, installed on a rotational shaft of the electrically-driven motor axially supported on the motor cover; and a position detection board directly or indirectly attached to the motor cover and on which a magneto resistive effect element detecting a magnetic pole information signal of the rotor in cooperation with the position detection purpose permanent magnet is mounted.

In a preferred aspect of the electrically-driven power steering apparatus, on the position detection board, either an amplifying circuit that amplifies the magnetic pole information signal of the magneto resistive effect element or a microcomputer and its peripheral circuit having a calculation function to calculate a magnetic pole information from the magnetic pole information signal of the magneto resistive effect element is mounted.

In a preferred aspect, in either aspect of the electrically-driven power steering apparatus, the electronic control unit includes: a power supply circuit section; an electric power conversion circuit section; and a control circuit section, a bus bar is fixed to the motor cover for connecting a winding of the stator to the electric power conversion circuit section, and the position detection board is fixed to an attachment boss installed on the bus bar or fixed to another attachment boss installed on the motor cover.

In another preferred aspect, in any one of the aspects of the electrically-driven power steering apparatus, the electronic control unit is arranged in an order of the control circuit section, the electric power conversion circuit section, and the power supply circuit section, as viewed from the motor cover, and the position detection board is arranged between the control circuit section and the motor cover.

In a still further aspect, in any one of the aspects of the electrically-driven power steering apparatus, the electronic control unit is arranged in an order of the control circuit section, the electric power conversion circuit section, and the power supply circuit section, as viewed from the motor cover, and the position detection board is arranged between the control circuit section and the motor cover.

In a still further aspect, in any one of the aspects of the electrically-driven power steering apparatus, the position detection purpose permanent magnet is attached to a terminal section of the rotational shaft, the magneto resistive effect element is mounted on the position detection board at a position opposed against the position detection purpose permanent magnet, and, furthermore, the motor housing space and the ECU housing space are shielded by the motor cover, the bus bar, and the position detection board.

In a still further aspect, in any one of the aspects of the electrically-driven power steering apparatus, the position detection purpose permanent magnet is attached to a terminal section of the rotational shaft, the magneto resistive effect element is mounted on the position detection board at a position opposed against the position detection purpose permanent magnet, and, furthermore, a magnetic shield plate is mounted on a surface of an opposite side to the position detection board on which the magneto resistive effect element is arranged.

As a still further aspect, in any one of the aspects of the electrically-driven power steering apparatus, the position detection purpose permanent magnet is attached to a terminal section of the rotational shaft, the magneto resistive effect element is mounted on the position detection board at a position opposed against the position detection purpose permanent magnet, and, furthermore, the position detection board and a board on which the control circuit section is mounted are connected together via a floating connector and the magnetic pole information signal or the magnetic pole information is transmitted to the control circuit section.

EXPLANATION OF SIGNS

6 . . . electrically-driven power steering apparatus, 11A . . . motor housing, 11B . . . ECU housing, 12 . . . lid body, 12A through 12C . . . connector terminal sections, 14 . . . power supply circuit section, 15 . . . electric power conversion circuit section, 16 . . . control circuit section, 17, 18 . . . metal boards, 19 . . . capacitors, 20 . . . coil, 21 . . . switching elements, 22 . . . power supply side connector, 23 . . . high voltage side connector, 24 . . . low voltage side connector, 25 . . . switching elements, 26U, 26V, 26W . . . output connectors, 27A, 27B, 27C, 27D . . . connector terminals, 28 . . . inverter side connector, 29 . . . resin board attachment bosses, 30 . . . heat dissipation (radiation) board, 34 . . . power supply side connector terminal, 35 . . . high voltage side connector terminal, 36 . . . inverter side connector, 37 . . . low voltage side connector terminal, 38, 39 . . . control side connector terminals, 40 . . . high voltage side insulation region section, 41 . . . low voltage side insulation region section, 42 . . . bolt, 43 . . . stator, 44 . . . rotor, 45 . . . rotational shaft, 46 . . . ball bearing, 47 . . . pinion gear, 48 . . . motor cover, 49 . . . ball bearing, 50 . . . magnet holding member, 51 . . . position detection board, 52 . . . bas bar, 52h . . . hole section, 53 . . . bolt, 54 . . . housing recess section, 55 . . . position detection board, 56 . . . GMR element, 57 . . . detection board attachment boss, 58 . . . bolt, 59 . . . magnetic shield plate, 60 . . . floating connector.

The invention claimed is:

1. A drive apparatus, comprising:
an electrically-driven motor, housed within a motor housing space formed by a motor housing and a motor cover, having a rotor and a stator;
an ECU housing, coupled to the motor housing, and structured to provide an ECU housing space between the ECU housing and the motor cover;
an electronic control unit, housed in the ECU housing space between the ECU housing and the motor cover, configured to perform a driving control for the electrically-driven motor and structured to include a control circuit section configured to control switching elements of the electrically-driven motor and a power conversion circuit section having the switching elements to drive the electrically-driven motor;

a position detection permanent magnet installed on a rotational shaft of the electrically-driven motor axially supported on the motor cover; and a position detection board directly or indirectly attached to the motor cover and on which a magneto resistive effect element structured to detect a magnetic pole information signal of the rotor in cooperation with the position detection permanent magnet is mounted, the magneto resistive effect element being opposed against the position detection permanent magnet; and a control circuit board housed in the ECU housing space, a control circuit having a microcomputer and a peripheral circuit having a calculation function configured to calculate magnetic pole information using the magnetic pole information signal being mounted on the control circuit board, the control circuit board being connected to the position detection board using at least two connectors, each connector being arranged on either the position detection board or the control circuit board and configured to electrically connect a position detection section of the position detection board to the control circuit of the control circuit board, the position detecting board and the control circuit board being coupled to each other to be mutually faced against each other in a direction of a rotational axis of the electrically-driven motor and the connector for each of the position detection board and the control circuit board being interposed between the position detection board and the control circuit board, and in a state in which the motor housing and the ECU housing are coupled together and the respective connectors disposed at the position detection board and disposed at the control circuit board are coupled together in the direction of the rotational shaft, to transmit the pole information signal or the pole information of the magneto resistive element from the position detection section.

2. The drive apparatus as claimed in claim 1, wherein, on the position detection board, an amplifying circuit that amplifies the magnetic pole information signal of the magneto resistive effect element is mounted.

3. The drive apparatus as claimed in claim 2, wherein the electronic control unit includes a power supply circuit, an electric power conversion circuit, and the control circuit arranged in order of the control circuit, the electric power conversion circuit, and the power supply circuit, as viewed from motor cover, and the position detection board is arranged between the control circuit and the motor cover.

4. The drive apparatus as claimed in claim 3, wherein the position detection permanent magnet is attached to a terminal section of the rotational shaft, and the motor housing space and the ECU housing space are shielded by the motor cover, a bus bar, and the position detection board.

5. The drive apparatus as claimed in claim 3, wherein the position detection permanent magnet is attached to a terminal section of the rotational shaft, and a magnetic shield plate is mounted on a surface of an opposite side to the position detection board on which the magneto resistive effect element is arranged.

6. The drive apparatus of claim 5, wherein an area in which the magnetic shield plate projects toward a side of the magneto resistive effect element is at least as wide as an area of the magneto resistive effect element, and the magnetic shield plate is disposed between the position detection board and the circuit board.

7. The drive apparatus as claimed in claim 3, wherein the position detection permanent magnet is attached to a terminal section of the rotational shaft, and the position detection board and the circuit board on which the control circuit is mounted are connected together via a floating connector which is one of the at least two connectors, and the magnetic pole information signal or the magnetic pole information is transmitted to the control circuit.

8. The drive apparatus as claimed in claim 1, wherein the electronic control unit includes:

a power supply circuit,
wherein a bus bar is fixed to the motor cover, and the position detection board is fixed to an attachment boss installed on the bus bar or fixed to another attachment boss installed on the motor cover.

9. An electrically-driven power steering apparatus, comprising:

an electrically-driven motor, housed within a motor housing space formed by a motor housing and a motor cover, configured to provide a steering assistance force for a steering shaft;

an ECU housing, coupled to the motor housing, and structured to provide an ECU housing space between the ECU housing and the motor cover;

an electronic control unit, housed in the ECU housing space between the ECU housing and the motor cover, configured at least to determine a turning direction and a turning torque of a steering shaft of an automotive vehicle via a torque sensor and to calculate a drive manipulated variable of the electrically-driven motor;

a position detection permanent magnet, installed on a rotational shaft of the electrically-driven motor axially supported on the motor cover; and a position detection board directly or indirectly attached to the motor cover and on which a magneto resistive effect element structured to detect a magnetic pole information signal of the rotor in cooperation with the position detection permanent magnet is mounted, the magneto resistive effect element being opposed against the position detection permanent magnet; and a control circuit board in the ECU housing space, a control circuit having a microcomputer and a peripheral circuit configured to calculate magnetic pole information using the magnetic pole information signal detected by the magneto resistive effect element being mounted on the control circuit board, the control circuit board being connected to the position detection board using at least two connectors, each connector being arranged on either the position detection board or the control circuit board and configured to electrically connect a position detection section of the position detection board to the control circuit of the control circuit board, the position detecting board and the control circuit board being coupled to each other to be mutually faced against each other in a direction of a rotational axis of the electrically-driven motor and the connector for each of the position detection board and the control circuit board being interposed between the position detection board and the control circuit board, and in a state in which the motor housing and the ECU housing are coupled together and the respective connectors disposed at the position detection board and disposed at the control circuit board are coupled together in the direction of the rotational shaft, to transmit the pole information signal or the pole information of the magneto resistive element from the position detection section.

10. The electrically-driven power steering apparatus as claimed in claim 9, wherein, on the position detection board, an amplifying circuit that amplifies the magnetic pole information signal of the magneto resistive effect element is mounted.

11. The electrically-driven power steering apparatus as claimed in claim 10, wherein the electronic control unit includes:
a power supply circuit,
wherein a bus bar is fixed to the motor cover, and the position detection board is fixed to an attachment boss installed on the bus bar or fixed to another attachment boss installed on the motor cover.

12. The electrically-driven power steering apparatus as claimed in claim 10, wherein the electronic control unit includes a power supply circuit, an electric power conversion circuit, and the control circuit arranged in order of the control circuit, the electric power conversion circuit, and the power supply circuit, as viewed from the motor cover, and the position detection board is arranged between the control circuit and the motor cover.

13. The electrically-driven power steering apparatus as claimed in claim 12, wherein the position detection permanent magnet is attached to a terminal section of the rotational shaft, and the motor housing space and the ECU housing space are shielded by the motor cover, a bus bar, and the position detection board.

14. The electrically-driven power steering apparatus as claimed in claim 12, wherein the position detection permanent magnet is attached to a terminal section of the rotational shaft, and a magnetic shield plate is mounted on a surface of an opposite side to the position detection board on which the magneto resistive effect element is arranged.

15. The electrically-driven power steering apparatus as claimed in claim 12, wherein the position detection permanent magnet is attached to a terminal section of the rotational shaft, and the position detection board and the circuit board on which the control circuit is mounted are connected together via a floating connector which is one of the at least two connectors, and the magnetic pole information signal or the magnetic pole information is transmitted to the control circuit.

* * * * *